C. H. MARTIN.
BEARING FOR AXLES AND THE LIKE.
APPLICATION FILED JULY 14, 1917.
1,289,220.
Patented Dec. 31, 1918.
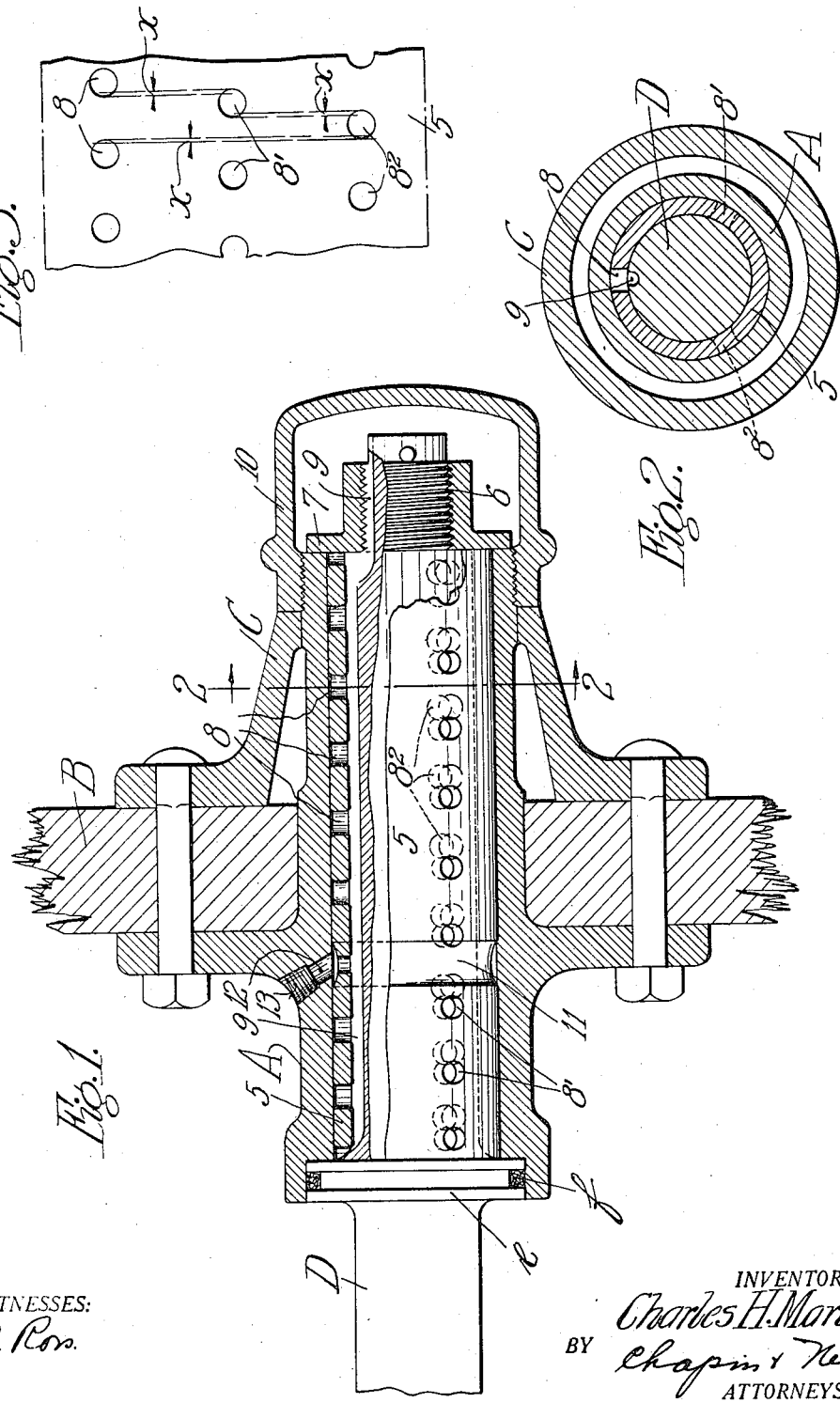
WITNESSES:
W.C. Ross.
INVENTOR.
Charles H. Martin.
BY Chapin & Neal.
ATTORNEYS.

UNITED STATES PATENT OFFICE.

CHARLES H. MARTIN, OF WEST SPRINGFIELD, MASSACHUSETTS.

BEARING FOR AXLES AND THE LIKE.

1,289,220.  Specification of Letters Patent.  Patented Dec. 31, 1918.

Application filed July 14, 1917. Serial No. 180,591.

*To all whom it may concern:*

Be it known that I, CHARLES H. MARTIN, a citizen of the United States of America, residing at West Springfield, in the county of Hampden and State of Massachusetts, have invented certain new and useful Improvements in Bearings for Axles and the like, of which the following is a specification.

This invention relates to improvements in bearings for axles and the like and is more particularly concerned with an improved anti-friction bearing and axle construction to provide for effective operation and lubrication of the latter.

An object of the invention is to provide a combined rotatable bearing and lubricating means for axles, characterized in that, with a low cost construction, an effectively lubricated anti-friction bearing is provided.

Another object of the invention is to provide a tubular bearing constructed to lie between an axle and a rotatable member and to turn with relation to each, and a plurality of lubricant containing holes in the bearing to supply lubricant to both the axle and said member, together with a groove in the axle communicating with a supply of the lubricant and adapted to feed all said holes therefrom.

Another object of the invention is to provide a bearing of the class described wherein the lubricant containing holes are arranged in sets angularly spaced about the periphery of the bearing and the holes in successive sets are staggered in an axial direction so that all portions of the axle and rotatable member are exposed to lubricant during each revolution relatively to the bearing, the construction being particularly characterized in that the holes of the bearing provide for effective lubrication of both axle and member without materially lessening the effectiveness of its bearing function.

Other objects and advantages will appear in the following description and in the appended claims.

The invention, in an embodiment at present preferred, is shown for illustrative purposes, in the accompanying drawings, in which—

Figure 1 is a sectional elevational view of an axle and bearing embodying the invention;

Fig. 2 is a cross sectional view taken on the line 2—2 of Fig. 1; and

Fig. 3 is a diagrammatical view showing a portion of the bearing developed to best illustrate the spacing of the lubricant containing pockets.

Referring to these drawings, the invention, although capable of general application, will be disclosed in one of its specific uses, namely, as an axle bearing for vehicle wheels. A represents a suitable hub casing which is clamped to spokes B of the wheel by a flange C and the bolts shown, the flange C having a supporting engagement with casing A, as shown in Fig. 1. D represents the axle which has thereon a circumferentially grooved collar $e$ to closely fit within a recess in one end of casing A. In the groove of collar $e$ is suitable packing material $f$ to retard leakage of lubricant from the interior of casing A. Within the latter and rotatable relatively thereto is a bearing bushing 5 within which an end of axle D is mounted for relative rotation. The extreme end of axle D has a necked down threaded portion 6 and a flanged nut 7 on the latter bears against the flange on axle D formed by the intersection of the portion 6 therewith. Collar $e$ and nut 7 prevent relative axial movement of axle D and the wheel by engagement with the ends of casing A. It is to be particularly noted that due to the provision of a rotatable bushing, as distinguished from an ordinary bearing bushing, the effective area of bearing surface is substantially doubled and as a result the objectionable wear is materially decreased.

The bushing 5 has a plurality of sets of holes therein; in the illustrated embodiment, three sets 8, 8', and $8^2$, equally spaced about the periphery of the bushing. Each set involves a plurality of holes arranged, in this instance, in a row parallel to the axis of the bushing. In Fig. 3, a fragment of the bushing 5 has been shown as developed to show the axial spacing of each set of holes relatively to the other. The holes in each set are equally spaced axially of the bushing, and the spacing adopted is slightly less than the diameter of a hole multiplied by the number of sets, in this instance, something less than three diameters. By this arrangement, the several sets may be staggered in an axial direction so that each hole of one set overlaps the hole of a succeeding set in an axial direction by a distance $x$. That is, the holes of each set are so spaced and the sets are so staggered that nowhere throughout the length of the bushing can a plane be passed through the latter perpendicular to its axis without intersecting a hole of one of the sets 8, 8′, or 8². It will thus be seen that according to my invention the lubricant which is placed in holes 8 in a manner to be described will reach preferably all, or substantially all, portions of the bearing part of the axle during each revolution of the wheel while the rotatable bushing or bearing at the same time has a construction useful for its function as well as for the lubrication feature of construction.

Referring now to Figs. 1 and 2, the axle D has a groove 9 in its periphery which extends from collar $e$ to the end of the threaded portion 6. This groove may be made best by a single milling cut which may dip down to include the length of portion 6. A hollow hub cap 10 is threaded onto casing A to inclose the nut 7 and the end 6 of the axle. One way in which the bearing may be filled with lubricant, generally grease or the like, is to pack the holes 8, prior to the assembly of parts, with the grease and to likewise pack groove 9 and hub cap 10. Another method of filling the bearing, and one which can be employed while the parts are assembled, is to remove hub cap 10, fill it full of grease, and then replace it on the casing A. By turning up the cap, the grease will be compressed, and then, if the wheel B is turned, the grease under pressure will be forced from groove 9 into all the holes as they come into alinement therewith. This method is a convenient one to employ for the replenishment of the lubricant, and the cap 10 preferably has sufficient capacity to supply all the holes. Thus, the holes may be entirely filled with grease, and during the movement of the wheel may be also fed from groove 9 which communicates at all times with the supply in cap 10, the leakage of grease from the casing being retarded by the described packing $f$.

The bushing 5 has formed in its external surface a circumferential groove 11, which, as shown in Fig. 1, communicates with one hole of each of the sets 8, 8′, and 8². A passage 12, formed in casing A, communicates with groove 11 and is normally closed by a plug to prevent the grease or other lubricant from leaving the interior of the casing. The structure just described is provided for the purpose of conveniently cleaning the axle and bearing. Thus, when cap 10 and plug 13 are removed, kerosene or the like may be introduced through passage 12 and thence by means of groove 11 may quickly reach one hole of each set 8, 8′, or 8². Then if the wheel is turned, groove 9 will successively come under each set 8, 8′, and 8², and the kerosene or other cleaning medium will quickly reach all parts of the bearing and effectively clean the same by flushing the material outwardly along groove 9 to the end of the axle.

Thus, an improved axle bearing has been provided which is characterized in that it combines in a relatively inexpensive construction an effective anti-friction rotatable bearing with an advantageous arrangement for effective lubrication.

The invention has been described in one embodiment for the purposes of illustration, but the scope of the invention is more properly defined by the appended claims rather than by the foregoing description.

What I claim is—

1. The combination with an axle and a wheel hub, of a combined bearing and lubricating bushing between the hub and axle and rotatable relatively to each, lubrication reservoirs provided in said bushing, each communicating with the bearing surfaces of the axle and hub, a main lubrication reservoir removably mounted on the hub, means communicating between the main and the first-named reservoirs, a passage provided in the hub communicating at one end with the first-named reservoirs, and means normally closing the other end of said passage, the latter arranged to permit flushing of the bearing and axle when the last-named means and main reservoir are removed.

2. The combination with a casing of a rotatable bearing bushing therein, an axle mounted in the latter, the axle and bushing being relatively rotatable, said axle and casing coöperating to inclose the bushing except for one end thereof, a hollow cap removably secured to the casing to inclose said end of the bushing and an end of the axle, a plurality of holes formed in the bushing and arranged in rows, a groove formed in the axle and communicating with the interior of said cap and adapted to communicate with each hole once during each relative revolution of the bearing, a circumferential groove formed in the external surface of the bushing and intersecting a hole of each row, a passage provided in the casing and opening at one end to said circumferential groove, and means to removably close the other end of said passage, all constructed and arranged so that lubricant may be supplied to all said holes from the interior of said cap and so that, when the latter and the last-named means are removed, the bearing and axle may be flushed from end to end.

3. The combination with an axle and wheel hub, of a combined bearing and lubricating bushing between the hub and axle and rotatable relatively to each, lubrication reservoirs provided in said bushing and communicating with the bearing surfaces of the axle and hub, a hub cap removably secured to the latter and inclosing one end of the hub, bushing, and axle, to form a main lubrication reservoir, said axle having a necked down and exteriorly threaded end which projects beyond the bushing and into the hub cap, a nut on said threaded end and bearing against said end of the hub, a longitudinal groove provided in the bearing surface of the axle and extending through the threaded end of the axle and said nut to communicate with the main reservoir, the other end of said hub provided with a counterbored portion leaving a shoulder substantially in the same vertical plane as the other end of said bushing, a collar rigid with the axle and fitting in said counterboard portion with one end face in engagement with said shoulder, whereby the end thrust of the wheel hub is transmitted directly to the axle and end play of the bushing is prevented by said collar and nut, and packing between the periphery of said collar and the circumferential wall of said counterbored portion.

CHARLES H. MARTIN.